(No Model.) 2 Sheets—Sheet 1.
J. H. STEVENS & M. C. LEFFERTS.
APPARATUS FOR PRODUCING PYROXYLIN SHEETS.
No. 573,928. Patented Dec. 29, 1896.
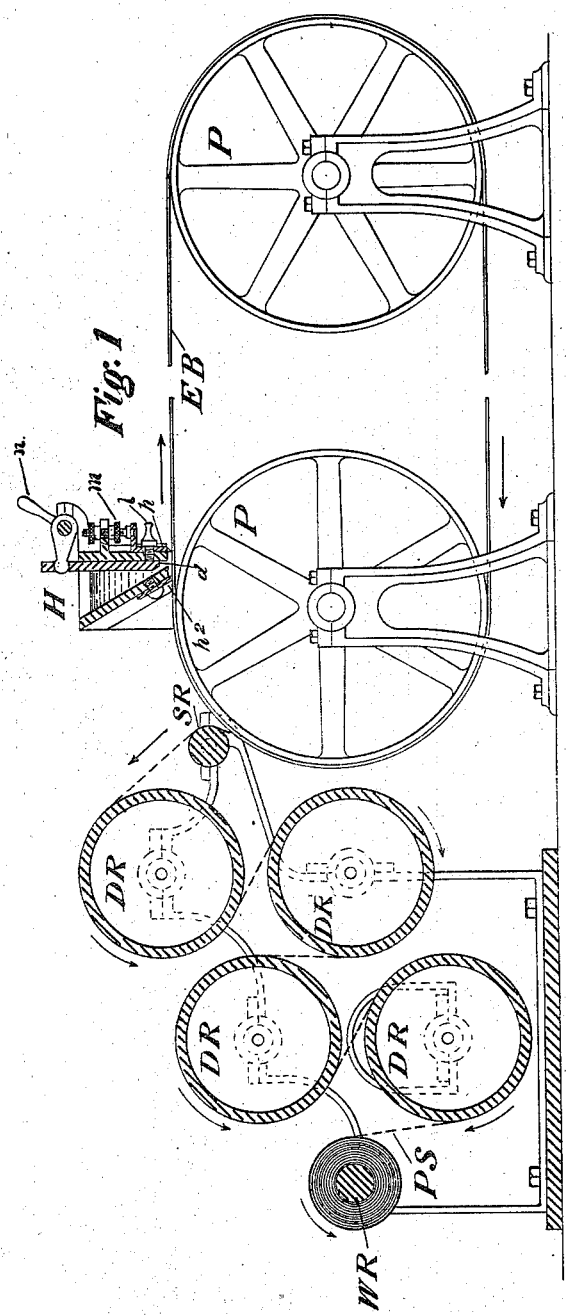
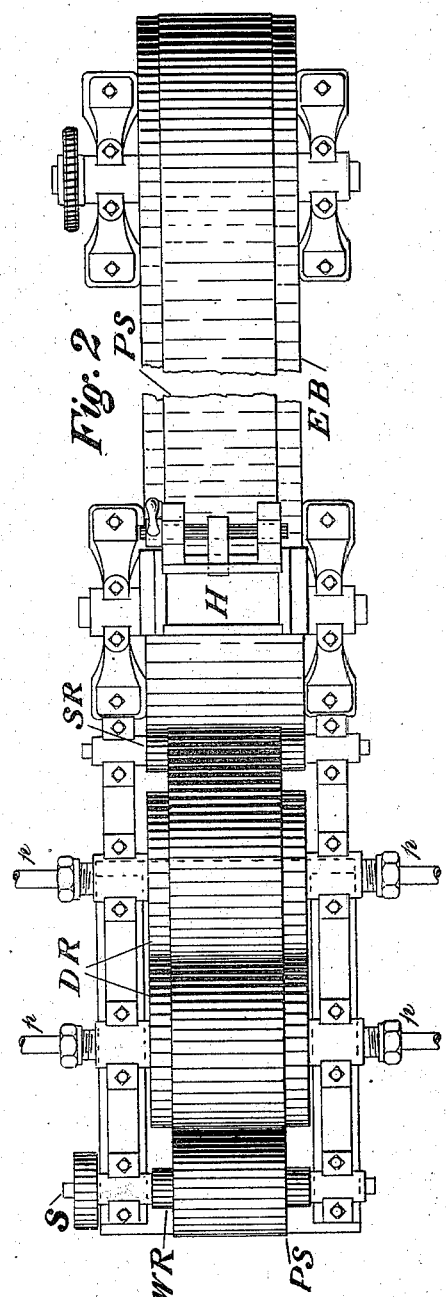
WITNESSES:
INVENTORS
John H. Stevens
Marshall C. Lefferts
BY
Betts Atterbury, Hyde & Betts
ATTORNEYS (No Model.) 2 Sheets—Sheet 2.
J. H. STEVENS & M. C. LEFFERTS.
APPARATUS FOR PRODUCING PYROXYLIN SHEETS.
No. 573,928. Patented Dec. 29, 1896.
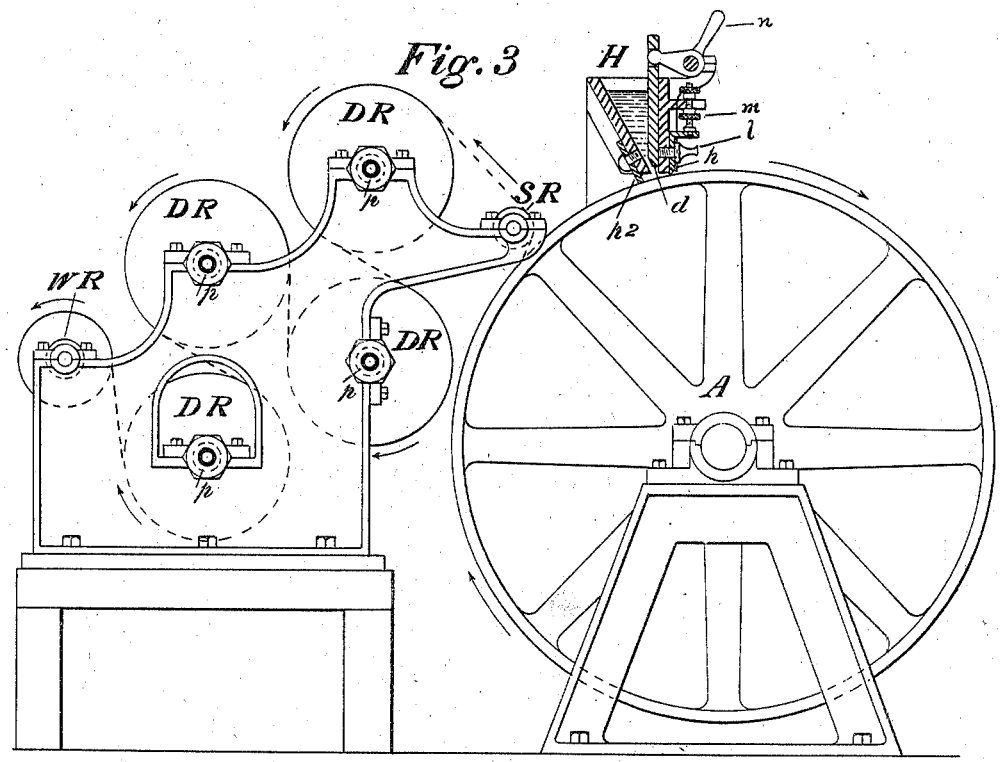
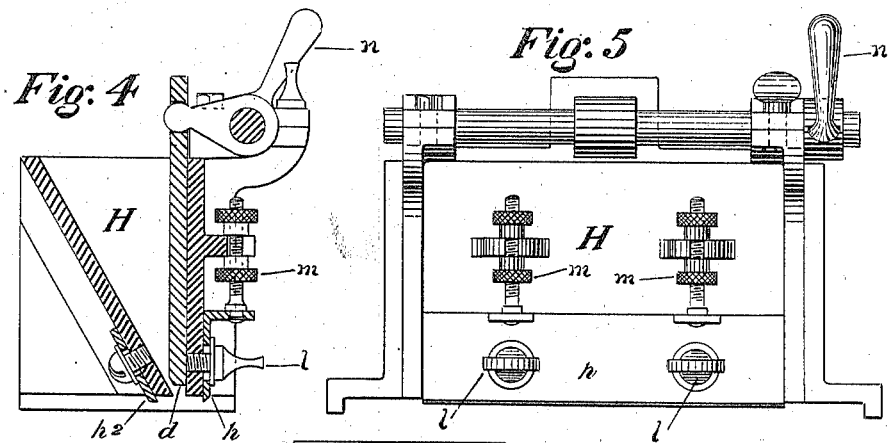
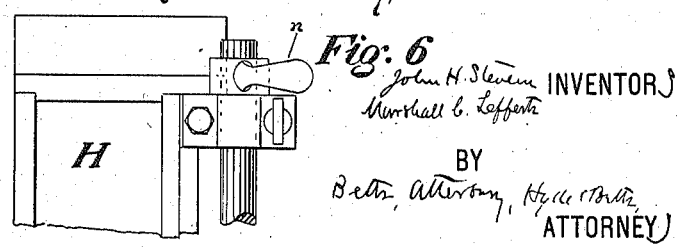
WITNESSES:
INVENTORS
John H. Stevens
Marshall C. Lefferts
BY
ATTORNEYS

UNITED STATES PATENT OFFICE.

JOHN H. STEVENS, OF NEWARK, NEW JERSEY, AND MARSHALL C. LEFFERTS, OF NEW YORK, N. Y., ASSIGNORS TO THE CELLULOID COMPANY, OF NEW YORK, N. Y., A CORPORATION OF NEW JERSEY.

APPARATUS FOR PRODUCING PYROXYLIN SHEETS.

SPECIFICATION forming part of Letters Patent No. 573,928, dated December 29, 1896.

Application filed July 17, 1891. Serial No. 399,832. (No model.)

*To all whom it may concern:*

Be it known that we, JOHN H. STEVENS, residing at Newark, in the county of Essex and State of New Jersey, and MARSHALL C. LEFFERTS, residing at New York city, in the county and State of New York, citizens of the United States, have invented certain new and useful Improvements in Apparatus for the Production of Pyroxylin Sheets, of which the following is a specification.

This invention has for its object the production of long sheets or films of pyroxylin material, useful for many purposes in the arts, as well as specially applicable to the manufacture of supports for photographic negatives or positives. Heretofore two general methods have been employed in making such sheets. In one of these the soluble pyroxylin has been dissolved in suitable solvents to a fluid or semifluid condition and then poured or spread upon a smooth surface of glass and permitted to dry, and afterward stripped from the glass in the form of a thin sheet. According to the other method which has been employed the pyroxylin has been converted into a solid compound by the use of a comparatively small proportion of solvent and by the aid of masticating operations in heated rolls, in which case the stimulating effect of the heat and pressure enabled the employment of so little solvent that the compound from first to last was maintained in a solid condition. This solid compound was molded into a block or other suitable shape and sheets cut from it, either in a lathe or planing-machine. The employment of this latter method has permitted the production of very long sheets; but in the method where thin pyroxylin solutions or compounds are spread upon a surface of glass and permitted to dry, which method is very desirable in certain applications, the size or superficial extent of the resultant sheet or film has been limited to the size of the glass employed, and hence the manufacture of sheets even of moderate length has been expensive and difficult. In this latter method glass was used because of the smoothness of its surface, which imparted a similar surface to the pyroxylin compound dried in contact with it, but more especially for the reason that the pyroxylin solution could not corrode or otherwise injure the polished surface of the glass. Although pyroxylin solutions had no corrosive effect upon glass, they were of such nature that their contact with metal was apt to corrode or oxidize the polished surface of any except some of the noble metals and so ruin the said surface for the purposes herein described.

We have discovered from our experiments that the corrosive action of pyroxylin solutions is due to the free acid left in the pyroxylin by imperfect washing or developed in it by decomposition, and we have ascertained that by using pyroxylin in which these acids have been thoroughly removed by careful washing or neutralized by means of some mild basic salt or substance (either while the pyroxylin is being washed or even after it has been dissolved) and also by using perfectly neutral solvents the power of corroding or oxidizing the baser metals ordinarily possessed by pyroxylin compounds is destroyed, and we are enabled to make a pyroxylin solution which, when coated upon a metallic surface and dried and stripped therefrom, has exactly the same appearance as though made upon glass, while the surface of the metal remains practically uninjured. We are thus enabled to replace the slow and expensive methods heretofore employed, wherein the pyroxylin material was spread upon glass of limited length, by substituting therefor a metallic surface, by which means we can obtain sheets in quality of finish or polish equal to those made upon glass.

One novel feature of this invention is, therefore, the substitution of a smooth metallic surface for the surface of glass which has heretofore been used in forming sheets from fluid pyroxylin compounds; and as an additional novelty of this invention we make such surface of metal in the form of an endless belt, upon which the pyroxylin solution is spread and dried while the belt is in motion, and then stripped from the belt before it has made a complete revolution, thus furnishing a means for manufacturing uniform sheets with great regularity and rapidity and of practically unlimited length, and the recovery of the evaporated solvents, which has heretofore been practically impossible, is by this means rendered perfectly practicable, because it permits the adoption of mechanism in which the ordinary methods of condensation are employed, all as is hereinafter explained.

In carrying out this invention an apparatus may be employed substantially as herein specified and as illustrated in the drawings, in which similar letters indicate similar parts.

Figure 1 is a longitudinal sectional view of our apparatus. Fig. 2 is a plan view of the same. Fig. 3 shows a modification. Figs. 4, 5, and 6 show enlarged detail views of hopper H.

The process of this invention forms the subject-matter of another application for Letters Patent of the United States filed by us, of even date herewith, Serial No. 399,833.

E B, Figs. 1 and 2, is an endless belt of metal of such thickness as to be strong but flexible, and made, preferably, of German silver or nickel-plated copper, placed around the pulleys P P, from which it receives its motion. This belt can be of any convenient width and length and can be supported or prevented from sagging by the use of idlers or other well-known means for supporting it between the pulleys P P. No mechanism for imparting motion to the pulleys P P is shown in the drawings. Any suitable mechanical means can be employed to move the pulleys so long as the arrangement permits the rate of speed to be regulated as desired, the rate of speed, as will be understood, depending upon the consistency or drying properties of the pyroxylin solution, length of belt, and other conditions.

In Fig. 3 a modification of the apparatus is shown by passing the endless belt around a large pulley or wheel A or using the surface of such wheel itself.

H is a hopper which contains a solution of the pyroxylin compound. It is open at its bottom at a point directly over the belt or wheel, and the size of this opening can be varied as desired by raising or lowering a plate d within the hopper by means of a handle n. The thickness of the strip of the solution which is flowed upon the wheel or belt is varied by means of a scraper h, which is moved to and from the belt by finger-screws m and is clamped in position by thumb-screws l. Scraper h² is composed of rigid material softer than the surface of the belt or wheel to avoid abrasion, and is in contact with the belt or wheel, so as to prevent the spread of solution in that direction. Figs. 4, 5, and 6 show enlarged views of hopper H, with the plate d and scrapers h and h².

S R, Figs. 1, 2, and 3, is a stripping-roll for stripping the pyroxylin sheet from the belt or wheel from whence it passes over the drying-rolls D R.

D R, Figs. 1, 2, and 3, is a series of rolls of smooth or polished metal, capable of being heated or cooled by suitable steam or water pipe attachments p, Figs. 2 and 3. These rolls can be replaced by any curved surfaces, such as half-rolls, answering the same end, or cloth or paper covered rolls can be used and furnish excellent means for drying. Provided the half-rolls do not offer too much friction for the passage of the film they will do fair work, but the revolving rolls or wheels are preferred.

W R, Figs. 1, 2, and 3, is a winding-roll upon which the sheet of dry pyroxylin compound can be wound. This winding-roll may consist of a simple spool of wood or other suitable material arranged so that it can be detached from the shaft S, carrying with it the pyroxylin sheet P S wound upon it, thus furnishing a convenient core for the same.

Pyroxylin compounds suitable for the formation of sheets by evaporation are too well known to require description. It is sufficient to say that the pyroxylin must be free from acid, as already described, and that the solvents employed should be neutral and of such a nature that the solvent will evaporate as rapidly as possible consistent with the desired quality of the resultant film and will leave the pyroxylin in the form of a smooth sheet of a homogeneous nature. The solubility of the pyroxylin and the employment of solvents in proper proportions to obtain the right consistency and of suitable volatility and freedom from water, and also the use in the mixture of solid solvents, like camphor and colorless ingredients, for transparent effects, and dyes or pigments or other substances which will modify the character of the dry sheet, are matters well understood by manufacturers of these compounds. The skilled operators in this art are acquainted with the requirements of pyroxylin solvents and the different effects produced in using solvents of varying characteristics, and therefore it is sufficient to state that among the solvents described in United States Letters Patent Nos. 269,340, 269,341, 269,342, 269,343, 269,344, and 269,345, issued on December 19, 1882, to the Celluloid Manufacturing Company on the applications of one of us, will be found substances possessing the requisite properties useful for the purposes of this patent.

In operating the apparatus the endless belt E B or the wheel A is set in motion in the direction indicated by the arrows in the drawings, and the hopper H, kept filled with the pyroxylin solution by any suitable means, spreads the solution in a layer of uniform thickness upon the belt or wheel. If a belt is used, it is preferably of such length and travels with only such speed as to permit the solution to part with sufficient of the solvent to become set or too stiff to flow before it has left the horizontal position and begun to pass over the first pulley to which it comes. The employment of the wheel is limited to cases where the solvents are sufficiently volatile to permit the spreading solution to set quickly, so that the absence of horizontal positions will not cause irregularities in the dried sheet by the flowing of the solution or compound. The speed of the belt or wheel, and also the flow from the hopper, should be so regulated that the sheet will have become sufficiently dry to be stripped and passed over the drying-rolls before it has made a complete revolution with the belt or wheel and before the portion of the belt to which it adheres reaches the hopper.

In regard to the stripping-roll S R we would state that it ought to be of small diameter, preferably about eight inches in diameter, of straight face and smooth surface, and to be parallel with the face of the belt or wheel. This stripping-roll performs the very important function of pulling the film from the belt or wheel with an even tension, and is preferably placed very close to the belt or wheel, so that the film will be stripped immediately after passing under the stripping-roll, or at the first point of contact therewith, and on a line with the centers of the roll and the nearest pulley or the wheel. This prevents stretching or distorting the film by reason of its tendency to leave the wheel or belt irregularly and not on a line parallel with the face of the wheel or belt. This stripping-roll is preferably arranged so as to revolve with the stripped film, but this is not absolutely necessary in order to keep the sheet straight, because it would perform the same function if fixed, but with more friction and danger of stretching the film. In the latter case any curved surface would answer in place of the roll.

By heating the drying-rolls D R in such a manner that the freshly-stripped sheet is brought successively in contact with rolls of constantly-increasing temperature the residues of volatile solvent are driven off very rapidly, and great economy in time is thus effected, and the capacity of the driving belt or wheel is also greatly increased, for it has been found that by maintaining a tension upon the sheets while they are in contact with heated rolls the evaporation of the solvent from the compound on the endless belt or wheel need only to be carried to a point where the solution will have become set in the condition of a moderately soft sheet, which can then be stripped and passed over the drying-rolls. In all cases it is preferable to attach a sufficient length of cloth to the ends of the sheet, so that it can be held taut and led around or held back while passing around the rolls or while being wound upon the spool or winding-roll W R. The last one or more drying-rolls over which the sheet passes are preferably of a lower temperature than the others, in order to chill the sheet before it is reeled upon the winding-roll W R.

In using cloth-covered rolls the drying may be done in the air at ordinary temperatures or in specially dry or slightly-heated air.

While we have described and shown a preferred form of apparatus, yet we desire it to be understood that this apparatus may be greatly varied and departed from without being outside the limits of our invention. For instance, instead of using one or more drying-rolls any other drying surface or surfaces may be used, preferably differing from each other in temperature, or a single surface may be used and parts of it vary from each other in temperature. Many other changes may suggest themselves to persons availing themselves of our invention and these be within the scope of our improvements.

Of course it is obvious that by using a very rapid drying solution on a very large wheel or extra long belt moving at a very slow rate of speed a film would be formed sufficiently dry to be used for a great many practical purposes, thus obviating the necessity for drying-rolls, but we do not prefer such a method in view of the excellent results produced by our preferred process.

When a polished sheet is required, the metal belt or wheel will also be polished on the side which comes in contact with the sheet, or, if the design is not too rough or deep, the metal surface can be given any character desired, which will be in turn imparted to the pyroxylin sheet with which it comes in contact. This apparatus can be connected with a suitable condensing apparatus for recovering the evaporated solvents by simply inclosing the endless belt or wheel wholly or partially in or permitting it to pass through a chamber containing chilled surfaces, with suitable means for carrying off the condensed solvents. Such chilled surfaces can be produced by freezing mixtures or by the expansion of gases, as is well understood. Suitable means for maintaining an elevated temperature in the film will in such case be preferable, and in fact the wheel or belt surface should in all cases be maintained at a temperature of at least 80° to counteract the chilling effect of evaporating liquids. This can be done by internal heating or any appropriate means.

The surface of the belt or wheel may be of any materials other than metal, such as glass or hard rubber, for instance, applied by a suitable means, which are capable of presenting a smooth highly-finished surface, and if the well-known difficulties in applying such surfaces are overcome and the surfaces be such that acids will not corrode them it will not of course be necessary to be so careful in freeing the pyroxylin from acids, but metal surfaces and carefully-prepared pyroxylin are the best conditions for successful work.

It is of course obvious that there is a limit to the thickness of sheets produced by this method and that heavy or thick sheets are practically excluded. Thin or fairly thin sheets are those contemplated, or such sheets as are usually made by evaporating down flowable pyroxylin solutions on surfaces.

The use of heat to produce fluidity in the solutions or the heating or cooling of any portion of the belt, pulley, or other mechanism employed for the purpose of modifying the evaporation or for other effects may be employed with the operation of this device.

By means of the herein-described mechanism beautiful smooth pyroxylin sheets of a homogeneous nature, uniform in thickness and of any desired length, can be easily and more rapidly produced and with much greater economy than has heretofore been possible with sheets of limited superficial measurement made by evaporating pyroxylin compounds on glass. These sheets can be used for all purposes to which other thin pyroxylin sheets have been heretofore applied, and they are specially applicable to photographic purposes, such as photographic-negative supports when transparent or semitransparent, and for photographic positives when suitably combined with pigments.

We are also aware that benzin and benzol and other hydrocarbons obtained from coal and petroleum have been employed in conjunction with such pyroxylin solvents as are capable of holding them in solution, for Alexander Rollason in English Patent No. 2,849 of 1858 and Henry Parkes in English Patent No. 1,866 of 1879 described such use of these naphthas, and we include the use of such substances in our process.

We are also aware that the term "pyroxylin compound" includes all mixtures, plastic or non-plastic, liquid, semiliquid, or solid, consisting of pyroxylin dissolved in or softened by or combined with solvents or other materials.

What we claim, and desire to secure by Letters Patent, is—

1. In a machine for making sheets or strips of pyroxylin compound, an endless carrier, a hopper, means for regulating the rate and quantity of flow of a solution of pyroxylin compound from the hopper and unto the carrier, an adjustable scraper for regulating the thickness of the film flowed, and means for confining the flow of the solution toward the aforesaid scraper, substantially as described.

2. In a machine for making sheets or strips of pyroxylin compound, a hopper having an opening in the bottom thereof, a plate within the hopper for varying the size of said opening, and an adjustable scraper-plate carried on the outside of the hopper, an endless carrier traveling underneath the hopper, and means for confining the flow of the solution toward the scraper, substantially as described.

In testimony whereof we affix our signatures, in presence of two witnesses, this 7th day of July, 1891.

JOHN H. STEVENS.
MARSHALL C. LEFFERTS.

Witnesses as to John H. Stevens:
  JENNIE A. SMITH,
  TIMOTHY E. SCALES.

Witnesses as to Marshall C. Lefferts:
  J. E. HINDON HYDE,
  H. V. N. PHILIP.